(12) United States Patent
Takuma

(10) Patent No.: US 6,283,377 B1
(45) Date of Patent: Sep. 4, 2001

(54) IC CARD FOR ACCUMULATING DEGREE OF INTEREST AND SYSTEM FOR ACCUMULATING DEGREE OF INTEREST USING SUCH CARD

(76) Inventor: Toshinori Takuma, c/o ROHM CO., LTD. of 21, Saiin Mizosaki-cho, Ukyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 09/018,335

(22) Filed: Feb. 4, 1998

(30) Foreign Application Priority Data

Mar. 28, 1997 (JP) .................................................... 9-077049
Mar. 28, 1997 (JP) .................................................... 9-077050

(51) Int. Cl.$^7$ .................................................. G06K 19/06
(52) U.S. Cl. ............................................. 235/492; 705/10
(58) Field of Search ................................. 235/492, 380, 235/381; 705/22, 27, 14, 10, 11

(56) References Cited

U.S. PATENT DOCUMENTS

| | | | |
|---|---|---|---|
| 4,044,860 | * 8/1977 | Kaneko et al. | 187/132 |
| 4,112,419 | * 9/1978 | Kinoshita et al. | 367/93 X |
| 4,356,387 | * 10/1982 | Tsubota | 377/6 |
| 4,528,679 | * 7/1985 | Shahbaz et al. | 377/6 |
| 4,839,631 | * 6/1989 | Tsuji | 340/451 |
| 5,138,638 | * 8/1992 | Frey | 377/6 |
| 5,331,312 | * 7/1994 | Kudoh | 340/541 |
| 5,519,669 | * 5/1996 | Ross et al. | 367/93 |
| 5,712,830 | * 1/1998 | Ross | 902/6 |
| 5,878,401 | * 3/1999 | Joseph | 705/22 |

FOREIGN PATENT DOCUMENTS

| | | |
|---|---|---|
| 61-211788 | 9/1986 | (JP) . |
| 62-74189 | 4/1987 | (JP) . |
| 3-273377 | 12/1991 | (JP) . |
| 6-68320 | 3/1994 | (JP) . |
| 7-297291 | 11/1995 | (JP) . |
| 9-212445 | 8/1997 | (JP) . |

OTHER PUBLICATIONS

Japanese Office Action dated Jul. 6, 1999.

* cited by examiner

*Primary Examiner*—Thien M. Le

(57) ABSTRACT

An IC card capable of accumulating the degree of shoppers' interest in a commodity is provided. For this purpose, the IC card has a front surface provided with a display for displaying information of the commodity. The displayed contrast thereof can be changed continuously or progressively in stages by shopper's touch to a sensor. The characters of the display are normally light, and therefore the shopper must touch the sensor to increase the contrast of the display in order to obtain more information of the commodity he/she is interested in. As a result, the shopper touches the sensor of the IC card attached to the commodity he/she is interested in. The number of times shoppers touch the commodity is counted by a counter, so that the degree of shoppers' interest in the commodity can be grasped quantitatively.

8 Claims, 5 Drawing Sheets

Fig. 5(a)  Fig. 5(b)

IC CARD FOR ACCUMULATING DEGREE OF INTEREST AND SYSTEM FOR ACCUMULATING DEGREE OF INTEREST USING SUCH CARD

BACKGROUND OF THE INVENTION

1. Field of the Invention

The present invention relates to an IC card, particularly a card used as a tag attached to a commodity for accumulating the degree of shoppers' interest in the commodity, and to a system for accumulating the degree of interest utilizing such card.

2. Description of the Related Art

Conventionally, tags have been attached to commodities for indicating the price, size, and material thereof and displayed at the store. Proposals have been made to employ IC cards as the tags and attach them to commodities for applications such as distribution management and the like so as to enhance the efficiency.

For retail stores actually selling commodities to shoppers, data related to the commodities drawing the shoppers' interest is extremely important for sales strategy. However, the conventional IC card tags described above do not accumulate the degree of shoppers' interest as objective data. Therefore, the degree of shoppers' interest is accumulated by a person in charge standing in front of a prescribed commodity and counting the number of times the shoppers touch the commodity. As a result, accumulating the degree of interest has been highly costly.

In addition, the conventional IC card described above is used only to indicate prescribed matters such as the price of the commodity, and therefore the card becomes useless to the shopper once he/she has purchased the commodity. Although the IC cards used as the tags can be collected by the retailer for reuse, good commodity service can be desirably provided if the use of the cards can be changed to a more valuable one to the purchaser when the commodity is sold.

In order to provide the IC card with a new use, the contents stored in the logic and the memory therein must be changed. However, the conventional IC cards described above do not have the arrangement that allows an easy change to be made at, for example, the sales area of the retail shop.

SUMMARY OF THE INVENTION

The present invention has been made to overcome the problems described above, with an object of providing an IC card for accumulating the degree of shoppers' interest in a commodity, and a system for accumulating the degree of interest utilizing such card.

Another object of the present invention is to provide an IC card that allows an easy change of its use to be made.

In order to achieve the above objects, the present invention relates to an IC card for accumulating the degree of shoppers' interest in a commodity, comprising a display unit for displaying prescribed commodity information capable of changing the displayed contrast, a sensor for sensing a touch of the shopper and, if the touch is sensed, changing the contrast of the display unit, and a counter for counting the number of times the sensor is touched. According to the IC card of the present invention, the degree of shoppers' interest can be accumulated as the number of times the shoppers touch the sensor.

According to the above arrangement that allows a change to be made in the contrast of the display unit, shoppers touch the sensor of the IC card attached to the commodity they are attracted to and increase the contrast of the display for checking the displayed content. The degree of shoppers' interest in the commodity can be accumulated by counting the number of times the shoppers touch the sensor.

The above IC card for accumulating the degree of interest further comprises a transmission/reception unit for communicating data with the outside world, a storage unit for storing prescribed data, and a control unit for controlling such operations. In the above IC card for accumulating the degree of interest, the contents of the storage and control units are changed based on a change signal received by the transmission/reception unit, so that a change in use of the card can be made.

Further, in the above IC card for accumulating the degree of interest, the control unit is formed by a reconfigurable FPGA and the storage unit is formed by any one of a flash memory, a ferroelectric memory and an SRAM.

According to the above IC card for accumulating the degree of interest, the change signal is transmitted by either wireless or wired communication.

The above arrangements make it possible to change the contents of the data and the logic incorporated therein so that use of the IC card can be changed, thereby expanding the use of the card.

In the above IC card for accumulating the degree of interest, antenna wire is provided around the side surface of the body thereof.

The above arrangement in which the antenna wire is provided around the side surface of the body allows a large effective area to be secured at the front surface for use as the display unit and the like.

In the above IC card for accumulating the degree of interest, a capacitor is provided at the rear surface of the body so as to supply electric power during operation consuming a large amount of power.

Since the capacitor is thus provided at the rear surface for supplying electric power during power-consuming operation, the capacitor with a large area can be formed, which leads to a high ability to supply electric power, without occupying the space for other elements.

The present invention is also directed to a system for accumulating the degree of interest in which the degree of interest accumulated by the above IC card is collected by a local control device provided at each sales area.

In addition, in the above system for accumulating the degree of interest, data related to the degree of interest accumulated by the IC card is fed back to the supplier of the commodity.

The above arrangement enables the local control device to easily collect the degree of interest accumulated by the IC card, thereby allowing prediction of a good seller.

BRIEF DESCRIPTION OF THE DRAWINGS

FIG. 5a is a front view showing another embodiment of the IC card for accumulating the degree of interest according to the present invention.

FIG. 5b is a partial side view showing the IC card for accumulating the degree of interest shown in FIG. 5a.

DESCRIPTION OF THE PREFERRED EMBODIMENTS

Now, preferred embodiments of the present invention will be described with reference to the drawings.

Embodiment 1

Figure 1:
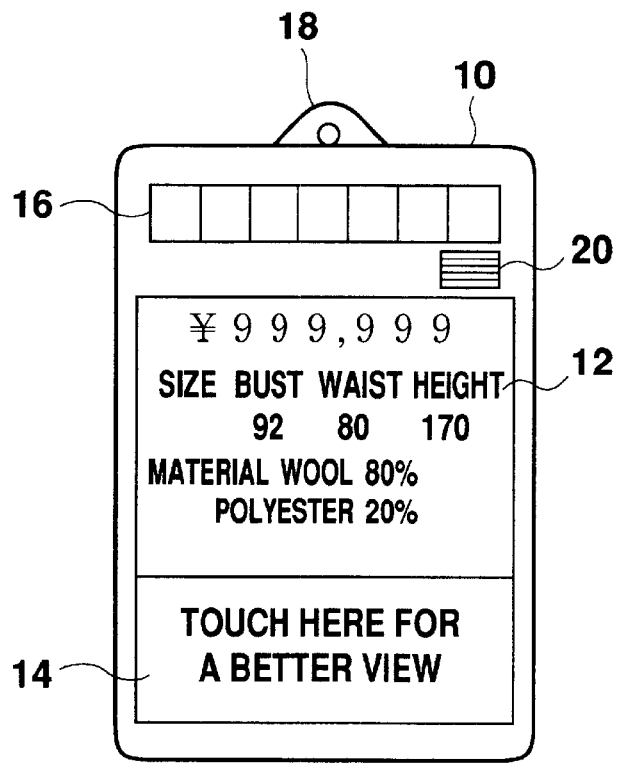
FIG. 1 is a front view showing one embodiment of an IC card for accumulating the degree of interest according to the present invention.

FIG. 1 is a front view showing an embodiment of an IC card for accumulating the degree of interest according to the present invention. Referring to FIG. 1, an IC card 10 attached to a commodity has a front surface provided with a display 12. The display 12 is used for displaying such necessary information as the price and size of the commodity. When a shopper touches a sensor 14, the contrast of the display can be changed continuously or progressively in stages, such as two stages of dark and light. Since the characters of the display are normally light and therefore barely visible, the shopper must increase the contrast of the display 12 by touching the sensor 14 to obtain more information about the commodity he/she is interested in. Thus, the sensor 14 of the commodity which has drawn the interest of the shopper is touched as a matter of course. Therefore, the degree of shoppers' interest can be judged as high or low by counting the number of times the sensor 14 is touched. The sensor suitable for use as the sensor 14 includes a pressure sensor capable of sensing a touch of shoppers, but any other sensors can be suitably used as long as they can sense a touch of shoppers when used as a tag.

The IC card 10 shown in FIG. 1 further includes solar cells 16 for supplying electric power to respective units, an attachment member 18 used for attaching the IC card 10 used as a tag to a commodity, a small speaker 20 for advertising the commodity with speech, and the like. The above-described display 12 can be formed by, for example, a Liquid Crystal Display (LCD), and a color liquid crystal display can also be used.

Figure 2:
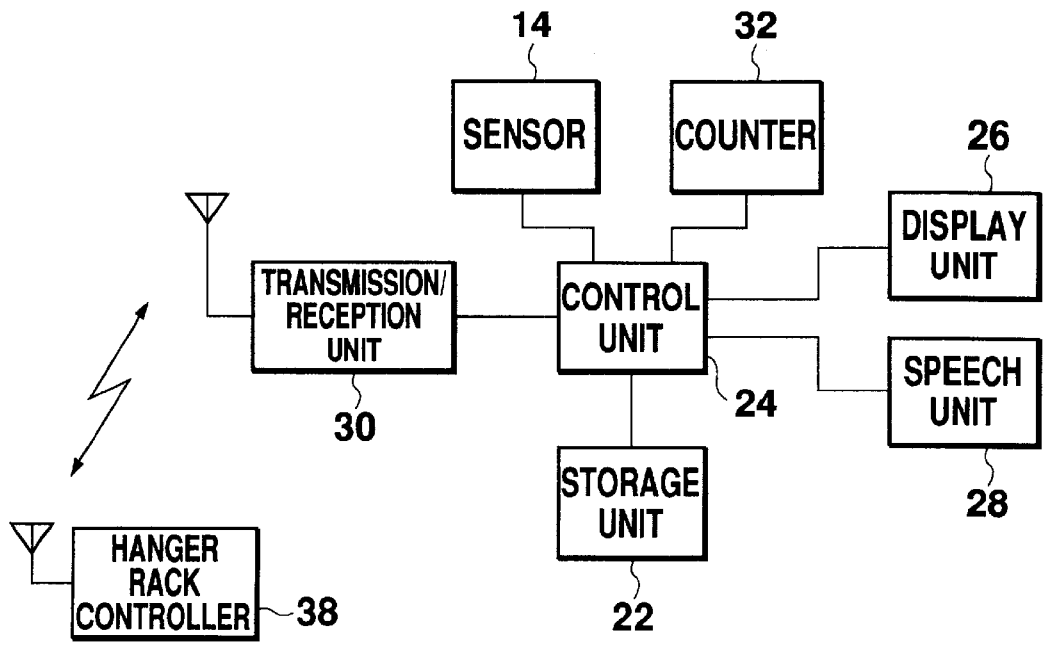
FIG. 2 is a block diagram showing an arrangement of the IC card for accumulating the degree of interest shown in FIG. 1.

FIG. 2 is a block diagram showing an arrangement of the IC card for accumulating the degree of interest according to the present embodiment. Referring to FIG. 2, the IC card 10 includes a storage unit 22 for storing necessary information. The information stored in the storage unit 22 travels through a control unit 24 and displayed at the display 12 controlled by a display unit 26. The information can be provided in the form of speech as well, if necessary, from the speaker 20 controlled by a speech unit 28. The IC card 10 of the present embodiment further includes a transmission/reception unit 30 for communicating prescribed information with a controller located outside thereof. Consequently, information as to whether or not a certain commodity actually exists in a predetermined place can be communicated and utilized for inventory control and prevention of theft.

Further, the control unit 24 is connected to the sensor 14 and a counter 32. As described above, the counter 32 counts the number of times shoppers touch the sensor 14 of the IC card 10 attached to the commodity they are interested in. The count of the counter 32 is stored in the storage unit 22. The number of times the sensor 14 is touched, or in other words the count indicated by the counter 32, is increased if the commodity attracts a high degree of interest from the shoppers. As a result, the degree of interest of the particular commodity can be grasped quantitatively. The data concerning the degree of shoppers' interest thus accumulated by the sensor 14 and the counter 32 is stored in the storage unit 22 and then transmitted to the outside controller through the transmission/reception unit 30.

Embodiment 2

Figure 3:
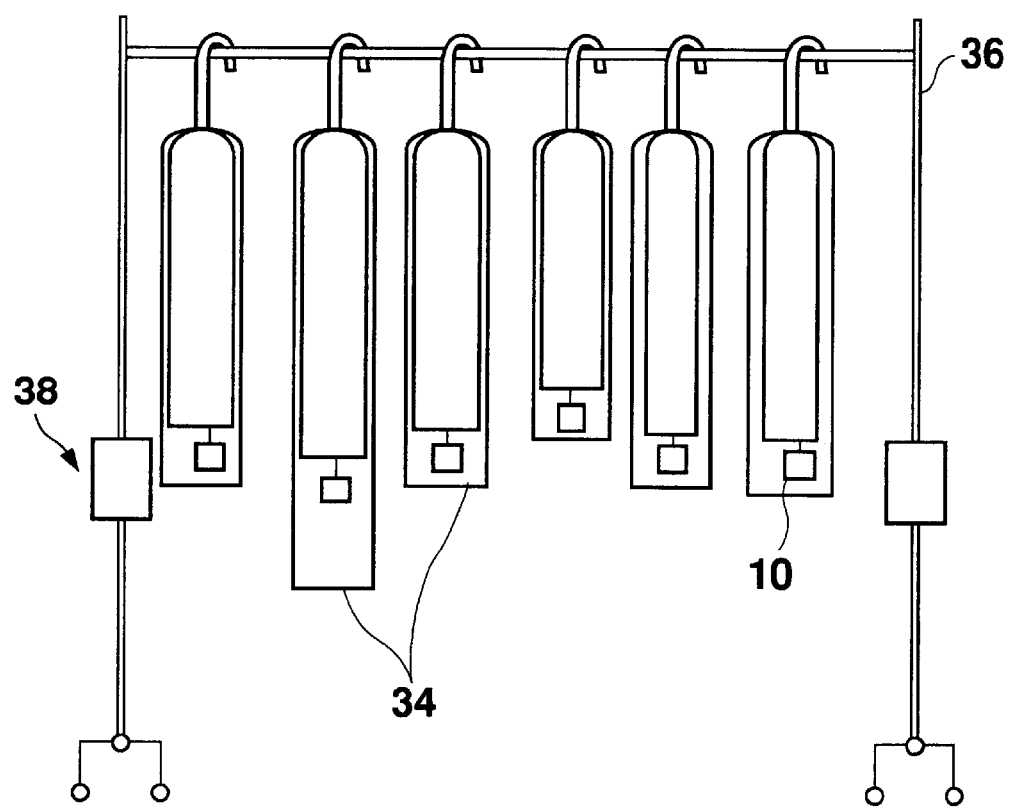
FIG. 3 shows an example of a system for accumulating the degree of interest utilizing the IC card for accumulating the degree of interest shown in FIG. 1.

FIG. 3 shows an exemplary system for accumulating the degree of interest employing the IC card according to the first embodiment. Referring to FIG. 3, a commodity 34 is a garment hung on a hanger rack 36. Each hanger rack 36 is provided with a hanger rack controller 38. In the present embodiment, the IC card 10 is suspended from each commodity.

As shown in FIG. 2, the hanger rack controller 38 can receive the information concerning the degree of interest of shoppers transmitted from the transmission/reception unit 30 of the IC card 10, and also accumulate the degree of shoppers' interest in the commodity on the hanger rack 36 at which the controller 38 is provided. Each hanger rack controller 38 recognizes before hand which commodities 34 are hung on the hanger rack 36 for which it serves, and manages the inventory and monitors theft using increase and decrease in number of the commodities. By giving an instruction to the hanger rack controller 38 from the external source, the displayed contents of all the IC cards 10 used as tags for the commodities 34 hung on the hanger rack 36 can be changed simultaneously. As a result, a collective change in display of the tags can be made, which has been done by hand in the conventional system, leading to a reduction in personnel expenses for this operation. In addition, while the conventionally used tag employs bar code or the like, use of the IC card 10 as a tag results in a considerable increase in type and amount of information that can be handled by the card. Therefore, the card can be used as a means of managing overall commodity distribution in addition to accumulating the degree of interest of shoppers. The IC card 10 for accumulating the degree of interest and the hanger rack controller 38 communicate with each other once in, say, ten seconds for transmission and reception of the data.

Figure 4:
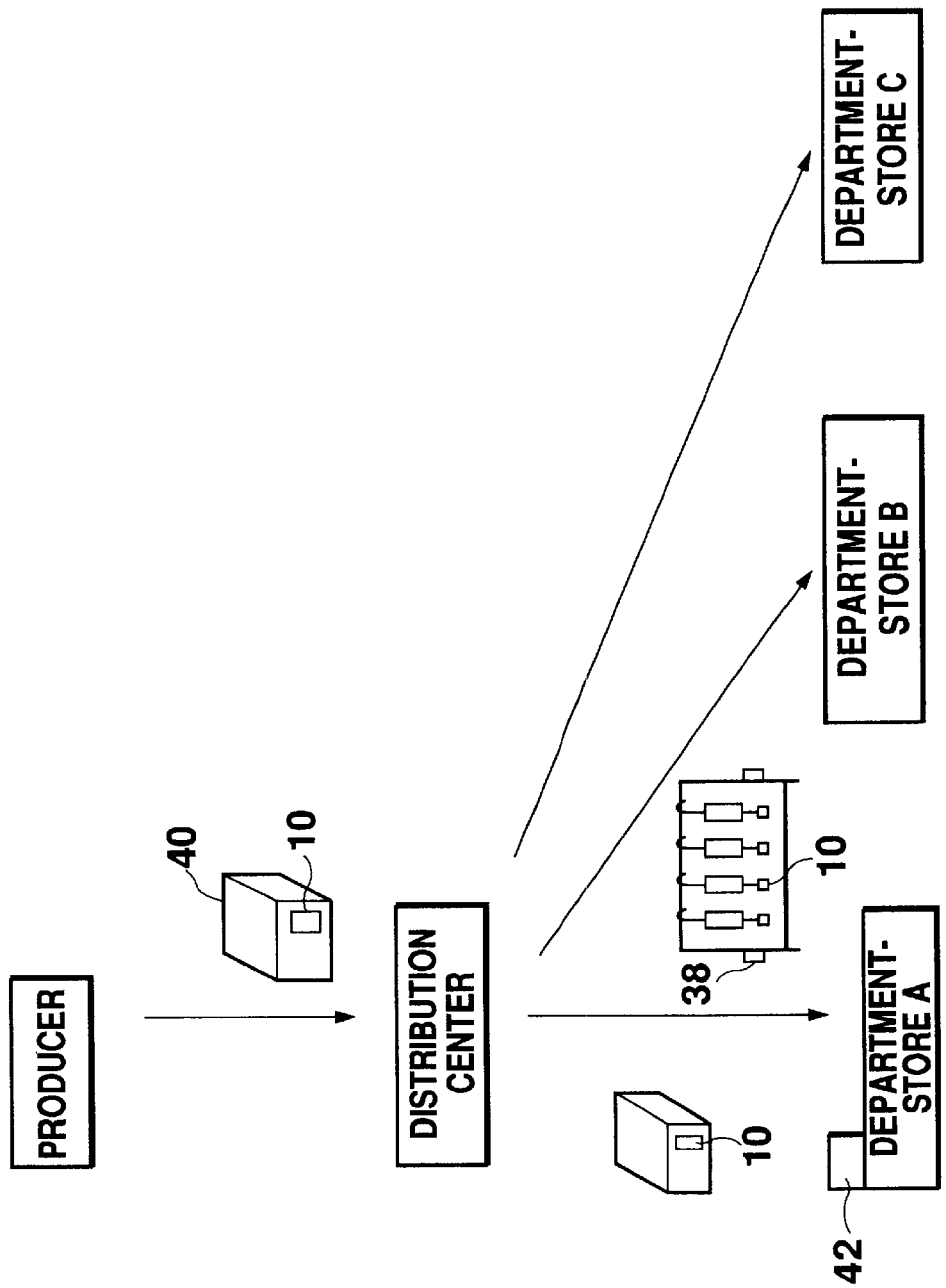
FIG. 4 shows an example of a distribution system utilizing the IC card for accumulating the degree of interest shown in FIG. 1 and a hanger rack controller.

FIG. 4 shows an example of the overall commodity distribution system utilizing the IC card 10 and the hanger rack controller 38 shown in FIG. 3. Referring to FIG. 4, the commodities produced by the producer are packed in a box, such as a corrugated cardboard box 40, and conveyed to the distribution center. In this event, each box 40 is provided with the IC card 10 according to the present embodiment. However, it should be noted that the card 10 is attached not for accumulating the degree of shoppers' interest but for communicating information between an on-vehicle controller (not shown) provided at a truck for conveying the commodities. As a result, the content and number of commodities loaded onto the truck can be constantly monitored, providing an aid for prevention of theft.

Each commodity arrived at the distribution center is provided with the IC card for accumulating the degree of interest. Next, as described above, the commodities are hung onto the hanger rack 36, which is provided with the hanger rack controller 38, whereby data is communicated between the IC card 10 for accumulating the degree of interest and the hanger rack controller 38 as described above. A remotely controlled Personal Digital Assistant (PDA) may be used at the distribution center so as to display the price of the respective commodities in a collective manner.

The commodity 34 hung on the hanger rack 36 is conveyed further from the distribution center to retailing department stores. Of course, it is also possible to convey commodities 34 still packed in the boxes 40 without being hung on the hanger rack 36 at the distribution center.

The commodity 34 arrived at the department store accumulates the degree of interest of shoppers with use of the IC card 10, and transmits the data concerning the degree of interest to the hanger rack controller 38. The data concerning the degree of interest obtained at the hanger rack controller 38 is transmitted to a local control device 42 located at each sales area of the retailing department store. The data as to the degree of interest thus obtained by the local control device 42 can be fed back to the distribution center and further to the producer. By thus feeding the data concerning the degree of interest back to the distribution center or the commodity suppliers including the producer, a good seller can be predicted at the upper stream of the commodity distribution. Consequently, the producer can determine which commodities should be produced in which amount. In addition, estimate can be made beforehand at the distribution center as to which commodities should be delivered to which department store at which timing in which amount.

The system similar to the one described above has been implemented as a Point-Of-Sale (POS) system. However, the POS system provides information as to the past result of which commodity was sold in which amount, and is not necessarily suitable for predicting which commodity will be sold in which amount in the future. According to the present embodiment, a commodity which is likely to sell good can be predicted with use of the data concerning the degree of interest accumulated by the IC card 10, which cannot be achieved by the conventional POS system.

Further, as described above, the IC card for accumulating the degree of interest can also be used for inventory management. More specifically, if the purchaser takes home the IC card 10 as well as the commodity 34 when he/she has purchased the commodity 34, the card which has been suspended at the hanger rack 36 does not exist there any more. By thus informing the hanger rack controller 38 or the local control device 42 of the sale of the commodity 34, decrease in inventory can be acknowledged to achieve inventory management. As a result, the present system can also provide the function similar to that provided by the POS system.

Embodiment 3

In order for the shopper to take the IC card 10 home as described in connection with the second embodiment, the use of the IC card 10 must be changed from the use as a tag.

Figure 5:
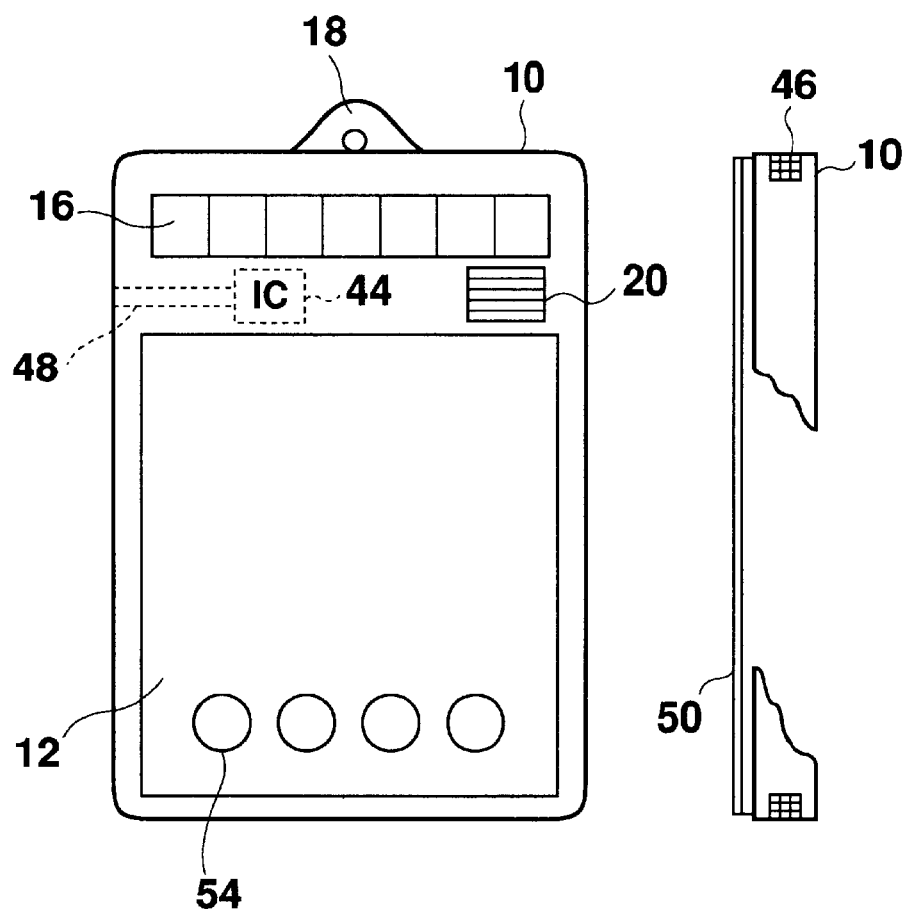

FIG. 5a is a front view showing an IC card capable of thus changing a use thereof, and FIG. 5b is a partially omitted side view of the card. In the figures, the elements identical to those in FIG. 1 are labeled with the same reference numerals and description thereof will not be repeated.

Referring to FIG. 5a, the IC card 10 has a front surface provided with the display 12 formed by an LCD or the like and the solar cells 16 for supplying power during normal operation. The IC card 10 contains therein an IC 44 for operation control.

Referring to FIG. 5b, the IC card 10 according to the present embodiment includes antenna wire 46 wrapped around the side surfaces thereof. As shown in FIG. 5a, the antenna wire 46 is connected to the IC 44 by antenna lead wire 48. Such arrangement enables the IC 44 to communicate with the outside controller through the antenna wire 46 for exchanging the prescribed information.

In addition, the IC card 10 further includes a capacitor 50 at the rear surface thereof, as shown in FIG. 5b. The capacitor 50 is formed by attaching a conductor in the form of a plate covering the entire rear surface of the body, so that a wide area can be secured therefor without obstructing other elements. As a result, sufficient operational power can be supplied during operation requiring a large amount of power, such as transmission of the data stored in the storage unit of the IC card 10 to the outside controller, that cannot be afforded by the power supplied by the solar cells 16 and the radio wave transmitted from the outside controller. The capacitor 50 stores electric power provided by the solar cells 16 and the radio wave transmitted from the outside controller while the above-described power consuming operation is not performed.

By thus providing the antenna wire 46 at the side surfaces of the body and the capacitor 50 for supplying power during power-consuming operation at the rear surface thereof, a large space is secured for the display 12 at the front surface of the body. In addition, such provision of the antenna wire 46 around the side surfaces of the body leads to reduction in thickness of the IC card 10.

Figure 6:
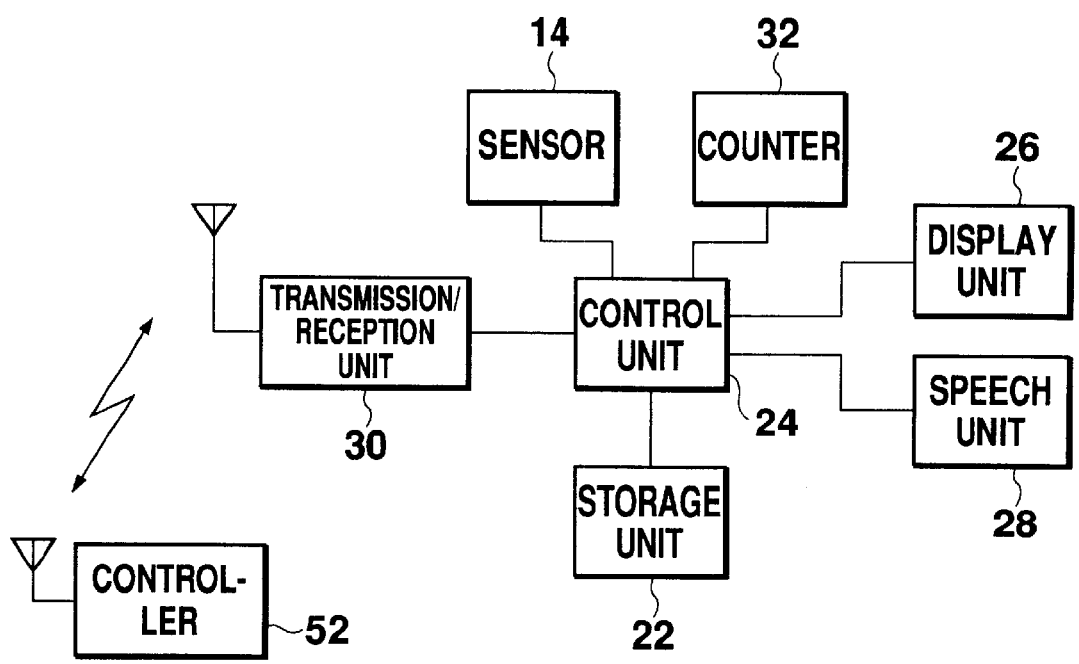
FIG. 6 is a diagram showing the arrangements of the IC card for accumulating the degree of interest shown in FIG. 5a and a controller located outside thereof.

FIG. 6 shows the arrangements of the IC card and the outside controller 52 according to the present embodiment. The arrangement of the IC card 10 shown in FIG. 6 is identical to that shown in FIG. 2. According to the present embodiment, the control unit 24 is formed by a reconfigurable Field Programable Gate Array (FPGA). The storage unit 22 may be formed by a flash memory, a ferroelectric memory, an SRAM, or the like.

The present embodiment is characterized in that when the transmission/reception unit 30 receives a predetermined change signal from the outside controller 52, the logic built in the control unit 24 and the data content stored in the storage unit 22 can be changed based on this change signal. Such change can be made by commonly-used methods of changing the logic in the reconfigurable FPGA and rewriting the memory content.

By thus changing the contents of the storage unit 22 and the logic built in the reconfigurable FPGA used in the IC card 10 based on the externally supplied change signal, the IC card used for a tag attached to a commodity can be used differently as, for example, a toy such as a portable game device. As a result, when a commodity is sold, the change signal is communicated from the outside controller 52 to change the contents of the memory and the logic built in the IC card 10 while the shopper pays for the commodity at the cashier, whereby the card can be used as a portable game device. Therefore, the portable game device comes with the commodity if the shopper takes home both the card and the commodity.

The above-described change signal can be communicated between the IC card 10 and the outside controller 52 by wireless radio communication through the antenna wire 46. Alternatively, the IC card 10 can include a terminal dedicated for communication of the change signal by wired communication.

It is also preferable to form, in advance, a switch 54 by a transparent electrode at a part of the display 12, as shown in FIG. 5a, in order for the IC card 10 to be used as a portable game device. Further, as shown in FIG. 5a, by providing the speaker 20 at the front surface of the IC card 10, speech may be output when the card is used as a portable game device depending on the content of the software.

The altered use of the IC card is not limited to a portable game device. The IC card can also be used as an alarm, a storage device for memos, or the like. Thus, the present invention achieves expansion of the use of the IC card.

As described above, according to the first and second embodiments of the present invention, the number of times the shoppers touch the sensor of the IC card for accumulating the degree of interest is counted, so that the degree of interest of the shoppers can be grasped quantitatively.

The data as to the degree of interest accumulated by the IC card is collected by the local control device, thereby achieving prediction of a future good seller.

According to the third embodiment of the present invention, communication is made with the outside controller to change the use of the IC card, so that the IC card can be efficiently reused for a different purpose.

Since the antenna wire required for data communication and the capacitor for supplying power are provided around the side surfaces and the rear surface of the body, respectively, a wide space is effectively secured at the front surface of the body to provide the display with a wide area.

In addition, provision of the antenna wire around the side surfaces of the body results in a thinner IC card.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An IC card attached to a commodity for accumulating the degree of shoppers' interest in the commodity, comprising:

a display unit for displaying prescribed commodity information, capable of changing a displayed contrast;

a sensor for sensing a touch of the shopper and, if the touch is sensed, changing the displayed contrast of said display unit; and a counter for counting the number of times said sensor is touched;

wherein the degree of shoppers' interest is accumulated as the number of times the shoppers touch said sensor.

2. The IC card for accumulating the degree of interest according to claim 1, further comprising:

a transmission/reception unit for communicating with the outside world;

a storage unit for storing prescribed data; and a control unit for controlling such operations;

wherein contents of said storage and control units are changed based on a change signal received by said transmission/reception unit so as to change the use of said IC card.

3. The IC card for accumulating the degree of interest according to claim 2, wherein said control unit is formed by a reconfigurable FPGA, and said storage unit is formed by any one of a flash memory, a ferroelectric memory, and an SRAM.

4. The IC card for accumulating the degree of interest according to claim 2, wherein said change signal is transmitted through either wireless or wired communication.

5. The IC card for accumulating the degree of interest according to claim 2, wherein antenna wire is provided around a side surface of a body.

6. The IC card for accumulating the degree of interest according to claim 2, wherein a capacitor is provided at a rear surface of a body for supplying electric power during operation consuming a large amount of power.

7. The IC card for accumulating the degree of interest according to claim 1, wherein the degree of interest accumulated by the IC card is collected by a local control device provided at each sales area.

8. The IC card for accumulating the degree of interest according to claim 7, wherein data concerning the degree of interest accumulated by the IC card is fed back to a supplier of the commodity.

* * * * *